No. 621,190. Patented Mar 14, 1899.
E. W. & N. WEISS.
HOOK AND EYE.
(Application filed Jan. 17, 1898.)

(No Model.)

Witnesses:
R. F. Weiss
H. H. Hain

Inventors:
Edward W. Weiss
Nettie Weiss

United States Patent Office.

EDWARD W. WEISS AND NETTIE WEISS, OF PENBROOK, PENNSYLVANIA.

HOOK AND EYE.

SPECIFICATION forming part of Letters Patent No. 621,190, dated March 14, 1899.

Application filed January 17, 1898. Serial No. 667,012. (No model.)

*To all whom it may concern:*

Be it known that we, EDWARD W. WEISS and NETTIE WEISS, citizens of the United States, residing at Penbrook, in the county of Dauphin and State of Pennsylvania, have invented new and useful Improvements in Hooks and Eyes, of which the following is a specification.

Our invention relates to improvements in hooks and eyes for fastening or connecting garments; and its object is to provide an improved construction of the same, whereby they may be connected with the garment without the use of stitching, as is now ordinarily the case.

The invention consists in the novel construction and combination of parts hereinafter fully described and claimed.

Figure 1:
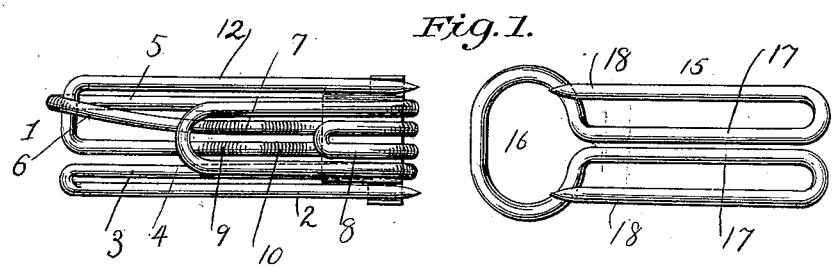
Figure 2:
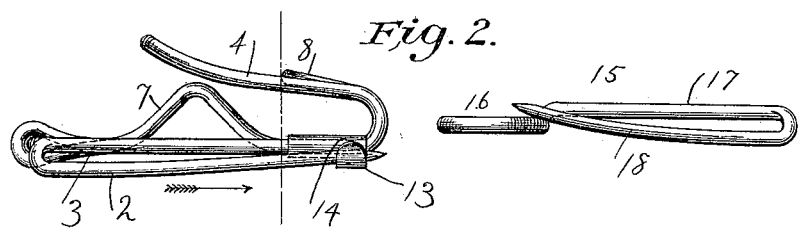
Figure 3:
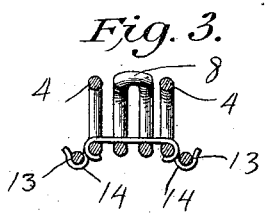

In the accompanying drawings, Figure 1 is a plan view showing a hook and eye constructed in accordance with our invention. Fig. 2 is a side elevation of the same. Fig. 3 is a section on the line x x, Fig. 2.

In the said drawings the reference-numeral 1 designates the hook proper, consisting of a piece of spring-wire comprising the pointed arm 2, the forwardly-extending arm 3, bent backwardly and then forwardly, forming a hook 4, then extending rearwardly and forwardly, forming arms 5 and 6 and the arm 6 formed with a hump 7, then bent backwardly and forwardly, forming a hook 8, then extended rearwardly, forming an arm 9, provided with a hump 10, then extended laterally between arms 5 and 6, and then forwardly, forming an arm 12, with a pointed end. Secured to the hook thus formed is a plate 13, provided with upwardly-extending lugs 14, which form catches for the pointed arms.

The numeral 15 designates the eye, consisting of a piece of wire bent at the center to form loop 16, then extended rearwardly, forming arms 17, and then forwardly, forming arms 18, the ends of which are sharpened or pointed.

In practice the hook is secured to a garment or other object by passing the pointed ends through the material thereof and engaging them with the catches 14. The eye is also secured to the garment by passing the pointed arms therethrough. To connect the edges of the garment, the loop of the eye is engaged with the hook 4, the humps 7 and 10 effectually preventing accidental disengagement. The hook 8 serves to strengthen the hook 4.

Having thus fully described our invention, what we claim is—

In a hook and eye, the combination with the hook consisting of a single piece of wire bent forwardly to form a pointed arm 2, then backwardly forming a parallel arm 3, then extending inwardly and outwardly forming a hook 4, then bent backwardly and forwardly forming arms 5 and 6, and the arm 6 bent upwardly forming a hump 7, then bent inwardly and outwardly forming a short hook, 8, then extended backwardly forming an arm 9 provided with a hump 10, then bent laterally outward and then forwardly forming a pointed arm 12, and the transverse plate secured to the front ends of the arms intermediate the arms 2 and 12, and having its ends bent upwardly forming catches, of the eye consisting of a single piece of wire bent to form a loop 16 and then extending outwardly forming arms 17 and then rearwardly forming pointed arms 18, substantially as described.

In testimony whereof we have hereunto set our hands in presence of two subscribing witnesses.

EDWARD W. WEISS.
    NETTIE WEISS.

Witnesses:
 RUDOLPH F. WEISS,
 CHAS. M. LIGHTNER.